US012694158B2

(12) United States Patent
Beauregard et al.

(10) Patent No.: US 12,694,158 B2
(45) Date of Patent: *Jul. 28, 2026

(54) AUTOMATIC SEGMENTATION USING HIERARCHICAL TIMESERIES ANALYSIS

(71) Applicant: Capital One Services, LLC, McLean, VA (US)

(72) Inventors: Adam Beauregard, Powhatan, VA (US); Michal Hyrc, McLean, VA (US); Peter Gaspare Terrana, Mechanicsville, VA (US); Vannia Gonzalez Macias, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/792,476

(22) Filed: Aug. 1, 2024

(65) Prior Publication Data

US 2024/0394416 A1 Nov. 28, 2024

Related U.S. Application Data

(63) Continuation of application No. 17/824,206, filed on May 25, 2022, now Pat. No. 12,079,375.

(51) Int. Cl.
*G06F 21/64* (2013.01)

(52) U.S. Cl.
CPC .................................. *G06F 21/64* (2013.01)

(58) Field of Classification Search
CPC ...................................................... G06F 21/64
See application file for complete search history.

*Primary Examiner* — Vance M Little

(74) *Attorney, Agent, or Firm* — Foley & Lardner LLP

(57) ABSTRACT

Methods and systems are disclosed for using a feature hierarchy with multiple levels with a different number of features at different levels to segment a dataset. The mechanism may use the first level of the hierarchy to segment a dataset into multiple datasets and then generate a timeseries dataset for each segment. Those timeseries datasets may be input into an anomaly detection model to identify a number of anomalies detected within those segments. Based on the number of anomalies not reaching a threshold, a second level of the hierarchy may be used to segment the dataset. Those segments may be input into the anomaly detection model to determine a number of anomalies for the second level. This process may continue until a level of the hierarchy is determined such that the number of anomalies reaches the threshold. The mechanism may then generate a security rule to deal with the anomalies.

20 Claims, 8 Drawing Sheets

100

100

| Location | Bytes Read | Folder ID | System ID | TimeStamp |
|----------|-----------|-----------|-----------|-----------|
| New York | 1124 | Folder_A | System_1 | 01:01:01 |
| New York | 1126 | Folder_A | System_1 | 01:01:02 |
| Seattle | 1175 | Folder_B | System_2 | 01:02:01 |
| Seattle | 1134 | Folder_B | System_2 | 01:01:04 |
| New York | 7777 | Folder_A | System_1 | 01:01:04 |

| Location | Bytes Read | Folder ID | System ID | TimeStamp |
|---|---|---|---|---|
| New York | 1124 | Folder_A | System_1 | 01:01:01 |
| Seattle | 1126 | Folder_A | System_2 | 01:01:02 |
| New York | 7777 | Folder_A | System_1 | 01:02:01 |

320

| Seattle | 1175 | Folder_B | System_2 | 01:01:04 |
|---|---|---|---|---|
| Seattle | 1134 | Folder_B | System_2 | 01:01:04 |

| Record ID | Bytes Read | Folder ID | System ID |
|-----------|------------|-----------|-----------|
| 1 | 1124 | Folder_A | System_1 |
| 5 | 7777 | Folder_A | System_1 |

520

| | | | |
|-----------|------------|-----------|-----------|
| 3 | 1175 | Folder_B | System_2 |
| 4 | 1134 | Folder_B | System_2 |

540

| | | | |
|-----------|------------|-----------|-----------|
| 2 | 1126 | Folder_A | System_2 |

| Merchant | Location | Feature 1 | Feature 2 | Amount |
|----------|----------|-----------|-----------|--------|
| AA_1 | New York | Value | Value | 7010 |
| AA_1 | New York | Value | Value | 7020 |

603 (Merchant)   606 (Location)   609 (Amount)

620

| | | | | |
|----------|----------|-----------|-----------|--------|
| AA_1 | Chicago | Value | Value | 200 |
| AA_1 | Chicago | Value | Value | 220 |

640

| | | | | |
|----------|----------|-----------|-----------|--------|
| CC_1 | New York | Value | Value | 100 |
| CC_2 | New York | Value | Value | 120 |
| CC_3 | New York | Value | Value | 7000 |

AUTOMATIC SEGMENTATION USING HIERARCHICAL TIMESERIES ANALYSIS

CROSS-REFERENCE TO RELATED APPLICATION

This application is a continuation of U.S. patent application Ser. No. 17/824,206, filed May 25, 2022. The content of the foregoing application is incorporated herein in its entirety by reference.

BACKGROUND

Anomaly detection is currently used in many areas of technology and for various purposes. For example, anomaly detection is used in identifying cybersecurity incidents, in monitoring computer systems for faults, in monitoring user transactions, etc. However, anomaly detection may be inaccurate in certain situations. For example, when there is an extremely large dataset with a large range of values in a target feature, anomaly detection systems may fail to identify anomalies, simply because those anomalies may not be apparent. Current systems have attempted to solve this problem by adjusting the sensitivity of anomaly detection systems. For example, if no anomalies are detected in a dataset, an anomaly detection system may be configured for a larger range of values to be considered anomalies. The downside of this solution is that many false positive results are detected. Those false positive results are generally investigated, requiring extra resources and extra time.

SUMMARY

One mechanism for addressing the above problem is to segment the large dataset into smaller datasets. However, simple segmenting without a logical approach may result in smaller datasets having the same problem, where anomalies are not apparent to anomaly detection systems. Thus, to solve this problem, a particular mechanism for segmenting large datasets into smaller datasets is desirable. In particular, the disclosed mechanism uses a hierarchy for segmenting each dataset. A hierarchy may include multiple levels with a different number of features (e.g., level one with one feature, level two with two features, level three with three features, etc.). The mechanism may segment a dataset first using the first level of the hierarchy into multiple datasets and then generate a timeseries dataset for each segment. Those timeseries datasets may be input into an anomaly detection model (e.g., a machine learning model) to identify a number of anomalies detected within those segments. Based on the number of anomalies not reaching a threshold, the mechanism may move to the second level of the hierarchy and generate different (more granular) segments based on that second level. Those segments may be input into the anomaly detection model to determine a number of anomalies for the second level of the hierarchy. This process may continue until a level of the hierarchy is determined such that the number of anomalies reaches the threshold. The mechanism may then generate a security rule based on the detected anomalies.

In a particular example, an enterprise may desire to monitor a number of bytes read for computing systems within the enterprise. This may be useful for identifying intruders when a large number of bytes is read within a short period of time. Thus, anomaly detection may be used for this purpose as an anomalous (or unusually high) number of bytes read may indicate an intruder. However, determining a value indicating an anomalous number of bytes read may be difficult because for one computer system, that value may be different than for another computer system. In some cases, that number may be different based on different locations of computer systems. In all of these cases, identifying the anomalous values may be difficult. To overcome this issue, it may be useful to segment the data into chunks, but selecting the right segmentation approach can be difficult. One such segregation feature may simply be a computer name, because each computer system may have different general bytes read values. Another parameter may be a folder name, as some folders are read from more frequently than others. In some instances, it may be useful to segregate the data on both computer name and folder name.

Therefore, methods and systems are described herein for segmenting large datasets into timeseries datasets and generating security rules based on detected timeseries anomalies. A data analysis system may be used to perform these operations. The data analysis system may determine a hierarchy for segmenting a dataset. The hierarchy may include multiple levels such that each level of the hierarchy is associated with a corresponding number of features. For example, the hierarchy may include a first level indicating one feature, a second level indicating two features, a third level indicating three features, a fourth level indicating four features, etc. In some embodiments, the hierarchy may include a feature identifier for each feature. However, in some embodiments, the hierarchy may not include feature identifiers and may instead rely on the disclosed mechanism to identify which features should be used.

The data analysis system may generate a first plurality of timeseries dataset segments based on a first level of the hierarchy and an aggregation time interval. The first level of the hierarchy may correspond to a first number of features. For example, the first level of hierarchy may specify one feature, two features, three features, or another suitable number of features. In some embodiments, the hierarchy may specify feature identifiers, while in other embodiments, the hierarchy may not specify feature identifiers. Thus, each timeseries dataset segment may include a value for a target feature and be associated with a time interval (e.g., an hourly interval).

The data analysis system may input each timeseries dataset segment of the first plurality of timeseries dataset segments into an anomaly detection model to obtain a first number of anomalies for the first plurality of timeseries dataset segments. For example, the anomaly detection model may be a machine learning model for identifying anomalies in a dataset. Thus, the anomaly detection model may output a number of anomalies within each dataset and/or a total number of anomalies detected.

The data analysis system may then determine that the first number of anomalies does not meet a threshold. For example, it may be common for a particular kind of dataset to have approximately one hundred anomalies or maybe one thousand anomalies. Thus, the threshold may be set to that number or a number larger by, for example, two deviations, to prevent false positives. Thus, if the anomaly detection system outputs twenty anomalies, the threshold will not be met. That is, the number of anomalies would indicate that the dataset has not been segmented enough or in a way that enables accurate anomaly detection. The data analysis system may repeat the segmentation task until all the features or feature combinations have been attempted. Thus, if the first level of hierarchy calls for a two-feature combination and there are four different features, the data analysis system may perform these operations for each combination (e.g., for six combinations).

Thus, based on determining that the first number of anomalies does not meet the threshold, the data analysis system may generate a second plurality of timeseries dataset segments based on a second level of the hierarchy and the aggregation time interval. The second level of the hierarchy may correspond to a second number of features larger than the first number of features. For example, the first level of hierarchy may include two features, while the second level of hierarchy may include three features. Thus, the data analysis system may segment the dataset into a multitude of segments based on a three-feature combination. A three-feature combination segmentation may result in more segments with a smaller number of values than, for example, a two-feature combination.

The data analysis system may then input each timeseries dataset segment of the second plurality of timeseries dataset segments into the anomaly detection model to obtain a second number of anomalies for the second plurality of timeseries dataset segments. As above, the anomaly detection model may output a number of anomalies for each segment and/or a total number of anomalies. The data analysis system may then determine that the second number of anomalies meets the threshold. For example, if the anomaly detection model outputs one hundred twenty anomalies and the threshold is one hundred, the data analysis system may determine that the threshold has been met and may generate a corresponding security rule based on one or more anomalies within the second plurality of timeseries dataset segments. For example, the rule may relate to a number of bytes for a particular computing system or a particular folder that is allowed to be read every hour. This may give the investigators enough time to determine whether a breach has occurred. Thus, the rule may be temporary and either may automatically expire or may be removed once the investigation is over.

Various other aspects, features and advantages of the system will be apparent through the detailed description and the drawings attached hereto. It is also to be understood that both the foregoing general description and the following detailed description are examples, and are not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a dataset, in accordance with one or more embodiments of this disclosure.

FIG. 3 illustrates an excerpt of a segmented dataset, in accordance with one or more embodiments.

FIG. 5 illustrates another excerpt of the segmented dataset, in accordance with one or more embodiments.

FIG. 6 illustrates another excerpt of the segmented dataset, in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
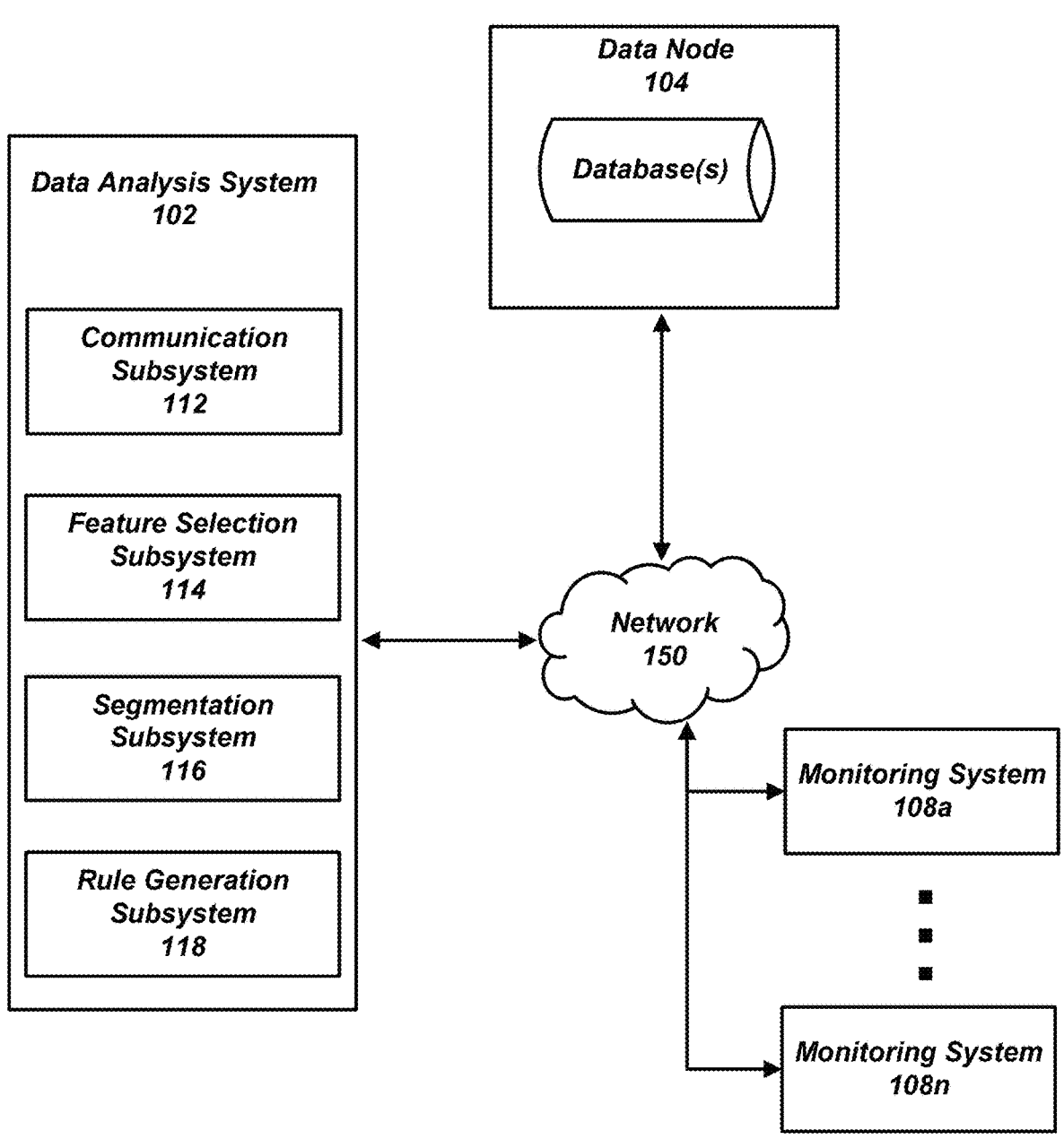
FIG. 1 shows an illustrative system for generating security rules based on timeseries anomalies, in accordance with one or more embodiments of this disclosure.

FIG. 1 shows environment 100, which includes a system for generating security rules based on timeseries anomalies. Environment 100 includes a data analysis system 102, data node 104, and monitoring systems 108a-108n connected by network 150. Data analysis system 102 may execute instructions for detecting anomalous access to system resources. Data analysis system 102 may include software, hardware, or a combination of the two. For example, data analysis system 102 may be a physical server or a virtual server that is running on a physical computer system.

Data node 104 may store timeseries data (e.g., in one or more databases). Data node 104 may include software, hardware, or a combination of the two. For example, data node 104 may be a physical server, or a virtual server that is running on a physical computer system. Monitoring systems 108a-108n may process alerts generated based on detected anomalies. Monitoring systems 108a-108n may include software, hardware, or a combination of the two. For example, each monitoring system 108a-108n may be a physical server, or a virtual server that is running on a physical computer system. Data analysis system 102, data node 104 and monitoring systems 108a-108n may reside on the same hardware servers, or on different hardware servers. In some embodiments, these components may reside on virtual servers. Network 150 may be a local area network, a wide area network (e.g., the Internet), or a combination of the two.

Data analysis system 102 may receive a dataset that includes a plurality of features and a plurality of entries, for example, using communication subsystem 112. Communication subsystem 112 may include software components, hardware components, or a combination of both. For example, communication subsystem 112 may include a network card (e.g., a wireless network card and/or a wired network card) that is coupled with software to drive the card. Communication subsystem 112 may store the dataset in a particular format in memory. When the dataset is received, communication subsystem 112 may pass the dataset to feature selection subsystem 114.

Feature selection subsystem 114 may include software components, hardware components, or a combination of both. For example, feature selection subsystem 114 may include software components that access the received dataset in memory and/or storage, and may use one or more processors to perform its operations. The feature selection subsystem may perform the operations described below.

Feature selection subsystem 114 may determine a hierarchy for segmenting a dataset. The hierarchy may include a plurality of levels and each level of the hierarchy may be associated with a corresponding number of features. For example, feature selection subsystem 114 may retrieve the hierarchy from a predetermined storage location. The hierarchy may be a data structure and may be stored in a file (e.g., an XML file). In some embodiments, the hierarchy may indicate, in addition to a number of features for each level, particular features that should be used in combination. In some embodiments, the hierarchy may indicate particular features that should be excluded from any combinations. For example, identifiers and timestamps should not be included in any combinations.

FIG. 2 illustrates table 200 that includes a plurality of rows representing a plurality of entries, and a plurality of columns representing fields in each entry. Row 201 represents a unique entry storing data extracted from, for example, system event data. The table may include field 203 indicating a location of the computing system that generated the event corresponding to the entry. Field 206 may store a number of bytes that were read as part of the request of this particular entry. Bytes read may be a target field that the system uses when generating a timeseries dataset. Field 209 may store a folder identifier for each entry. A folder identifier may be a folder path associated with the read event. Field 212 may store a system identifier indicating a computing device from which the event originated, and field 215 may store a timestamp. The timestamp may be stored in any format (e.g., year-month-date hour: minute: second).

In some embodiments, feature selection subsystem 114 may generate the hierarchy based on the fields within the dataset. For example, feature selection subsystem 114 may identify a particular target feature (e.g., field 206 of FIG. 2). That feature may not be used for the hierarchy. Furthermore, feature selection subsystem 114 may identify a timestamp field (e.g., field 215). That feature may be excluded from the hierarchy. However, in some embodiments, that feature may be included in the hierarchy. The other fields of the dataset may be included in the hierarchy. In some embodiments, the first level of hierarchy may include only one feature. However, in some embodiments, the first level of hierarchy may include multiple features.

FIG. 3 illustrates an excerpt of a segmented dataset. Segment 300 and segment 320 include entries that were segmented by field 306 (folder identifier). For example, a particular folder may be replicated onto different systems in different location. Thus, that folder may have different statistics (e.g., bytes read) in different locations. Segment 300 illustrates event entries for Folder_A while segment 320 illustrates event entries for Folder_B. Segment 300 and segment 320 may be referred to as a segment set. For example, if the first level of hierarchy defines a single feature for segmentation, feature selection subsystem 114 may generate segment sets for different features. For example, one segment set may include entries selected based on location (e.g., field 203 of FIG. 2). Another segment set may include entries selected based on a system identifier (e.g., field 212). Feature selection subsystem 114 may continue generating segment sets until all the features (e.g., except the target feature, the timestamp, and/or other suitable features) have been processed.

Feature selection subsystem 114 may pass the selections to segmentation subsystem 116 (FIG. 1). Segmentation subsystem 116 may include software components, hardware components, or a combination of both. For example, segmentation subsystem 116 may include software components that access selected segment sets in memory and/or storage, and may use one or more processors to perform its operations. Segmentation subsystem 116 may generate a first plurality of timeseries dataset segments based on a first level of the hierarchy and an aggregation time interval. The first level of the hierarchy may correspond to a first number of features. As discussed above, the first level of hierarchy may correspond to a single feature. In some embodiments, as discussed above, each timeseries dataset segment of the first plurality of timeseries dataset segments is generated based on values within one or more features of the dataset (e.g., based on values within, for example, field 203 such that each segment corresponds to a location).

In some embodiments, each level of hierarchy may specify the features that should be used for generating segments. That is, each level of the hierarchy may include one or more identifiers associated with one or more features for generating one or more corresponding segment sets. For example, if a dataset has five features, and one of the features is a time feature and another feature is a target feature, the first level of hierarchy may specify each of the other three features that may be used for generating segments and the second level of hierarchy may specify combinations of those three features that may be used for segmenting.

In some embodiments, segmentation subsystem 116 may use those specifications to generate the segments and/or segment sets. Segmentation subsystem 116 may retrieve, from a data structure representing the hierarchy, data associated with the first level of the hierarchy. For example, the hierarchy may include one or more XML files or may be stored in a database table. Thus, segmentation subsystem 116 may retrieve the hierarchy. Segmentation subsystem 116 may extract a plurality of features from the data associated with the first level of the hierarchy. For example, the XML file or the database table may include identifiers of features (e.g., names of features or column names) for features to be used in segmentation. Segmentation subsystem 116 may extract those features. Segmentation subsystem 116 may then generate a plurality of dataset segments based on the plurality of features extracted from the first level of the hierarchy.

In some embodiments, segmentation subsystem 116 may transform each segment into a timeseries dataset based on one or more features selected according to the first level of hierarchy. In addition, segmentation subsystem 116 may use the time interval to transform the data into a timeseries. For example, a time interval may be one hour, three hours, twelve hours, one day, one week, or another suitable time interval. In some embodiments, segmentation subsystem 116 may perform the following operations during the transformation process. Segmentation subsystem 116 may start the process by selecting a first entry from a first segment. The first entry may be associated with a first timestamp that is the earliest timestamp in the segment. For example, the segment data may be stored as a data structure (e.g., an array, a linked list, a stack, a queue, or another suitable data structure). In some embodiments, the entries of the segment may be stored chronologically within the data structure based on the timestamp. Thus, segmentation subsystem 116 may iterate, chronologically, through the plurality of entries until reaching a second entry with a second timestamp which is the last timestamp within a time slot associated with the first timestamp.

Prior to chronologically iterating through the entries, segmentation subsystem 116 may determine the time slot for the transformation operation. The transformation operation may be referred to as an aggregation. To determine the time slot for aggregation, segmentation subsystem 116 may retrieve the time interval. For example, the time interval may be one hour. When the time interval is retrieved, segmentation subsystem 116 may round down the first timestamp to the time interval. For example, if the first timestamp is 01:11:15, and the time interval is one hour, segmentation subsystem 116 may round down 01:11:15 to 01:00:00. In addition, segmentation subsystem 116 may round up the first timestamp based on the time interval. For example, if the first timestamp is 01:11:15, and the time interval is one hour, segmentation subsystem 116 may round up 01:11:15 to 02:00:00. Thus, the time slot would be from 01:00:00 to 02:00:00. Therefore, segmentation subsystem 116 may iterate chronologically through the entries until reaching the first entry that is found beyond the time slot. When that entry is found, all the other entries are selected for aggregation.

In some embodiments, segmentation subsystem 116 may aggregate an average of all entry values within the time range of aggregation. Segmentation subsystem 116 may aggregate the values based on count (e.g., a number of data points in the time slot), sum (the sum of the values for each data point in the time slot), or an average (the average of the values for each data point in the time slot). In some embodiments, the aggregation values may be a volume size (e.g., in bytes) for each system event. For example, segmentation subsystem 116 may add all the "bytes read" values for a particular hour to come up with the target value for that hour interval. In another example, segmentation subsystem 116 may generate a value for each time interval based on an average number of "bytes read" per entry.

When the timeseries dataset segments are generated, segmentation subsystem 116 may input each timeseries dataset segment of the first plurality of timeseries dataset segments into an anomaly detection model to obtain a first number of anomalies for the first plurality of timeseries dataset segments. In some embodiments, the anomaly detection model may be a regression model. In some embodiments, the anomaly detection model may be a machine learning model.

Figure 4:
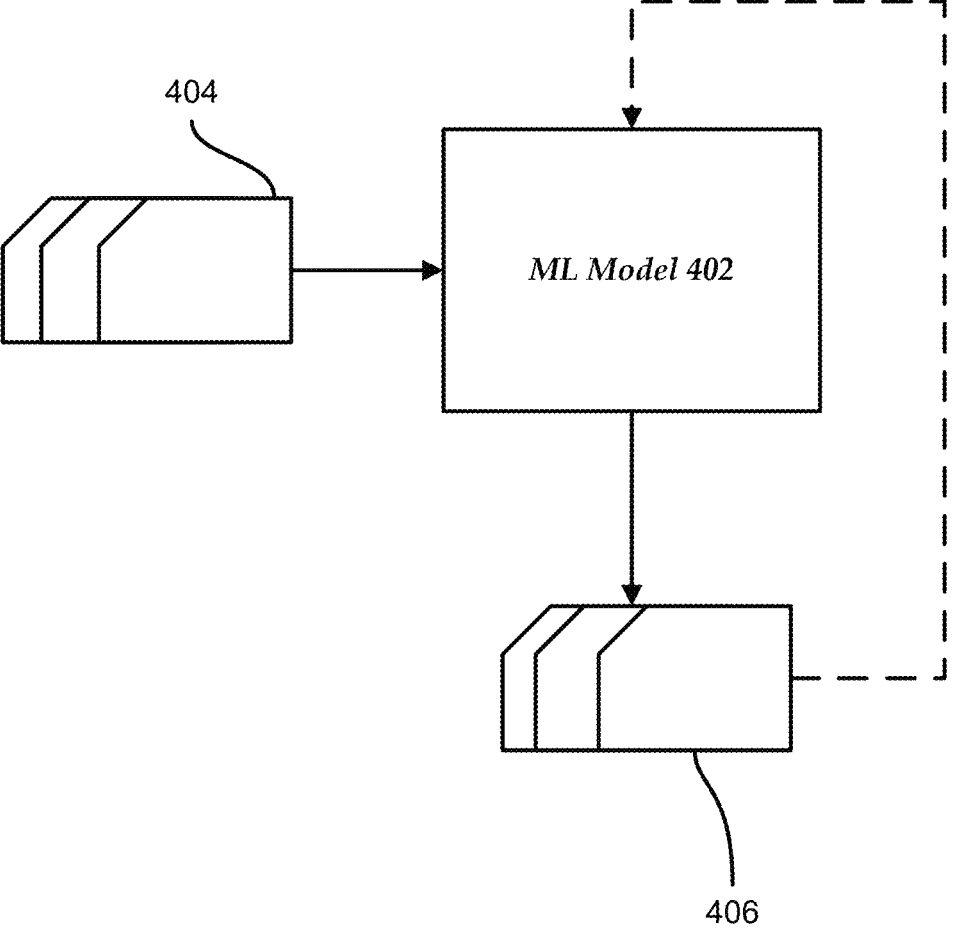
FIG. 4 illustrates an exemplary machine learning model for identifying auxiliary features, in accordance with one or more embodiments.

FIG. 4 illustrates an exemplary anomaly detection model based on machine learning. Machine learning model 402 (e.g., anomaly detection model) may take input 404 (e.g., a timeseries dataset segment), and may output timestamps 406 (sometimes referred to as output parameters) corresponding to anomalies detected by the model. Timestamps 406 may be output together with a probability that a particular timestamp corresponds to an anomaly detected in the time-series dataset segment.

The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, machine learning model 402 may be trained to perform anomaly detection using one or more supervised techniques. As an example, a training dataset including entries labeled with "anomalous," "normal," or one or more other labels or label sets may be obtained and used to train machine learning model 402. In one use case, an entry without an anomaly may be labeled as "normal," while an entry including anomalous data may be labeled "anomaly." In another use case, a Boolean may be used to label anomalous entries versus normal entries such that a "True" label represents an entry including anomalous value(s), and a "False" label represents an entry without an anomalous value.

In some embodiments, machine learning model 402 may be trained to perform anomaly detection using one or more unsupervised techniques. For example, an isolation forest algorithm or other decision tree algorithm may be used to configure machine learning model 402 based on a training dataset in an unsupervised manner. In one use case, an isolation or other decision tree (e.g., corresponding to machine learning model 402) may be trained or generated by selecting one or more features from the training dataset (e.g., selecting one or more parameters of the training dataset) and randomly selecting one or more values for a selected feature for splitting the data of that feature (e.g., randomly selecting a value between maximum and minimum values of that feature). In this way, for example, the decision tree will have a high likelihood of shorter paths in decision trees for anomalous data points, thereby identifying data points corresponding to anomalous data.

The machine learning model may output a number of anomalies for each segment and segmentation subsystem 116 may calculate the total number of anomalies detected for all the segments. For example, each segment set may include segments that encompass all the entries of the dataset (e.g., segment 300 and segment 320 may constitute a segment set). Thus, segmentation subsystem 116 may determine a number of anomalies for each segment set. For example, a segment set based on a folder identifier (e.g., field 306 of FIG. 3) may have one number of anomalies. However, a segment set based on segmentation by a system identifier (e.g., field 212 of FIG. 2) may have a different number of anomalies.

Segmentation subsystem 116 may determine that the first number of anomalies does not meet a threshold. For example, data analysis system 102 may store a threshold for a number of anomalies that need to be detected within the dataset segments to determine that the segmentation is successful. The threshold may be determined based on a usual number of anomalies detected in such a dataset. For example, if on average one hundred or one thousand anomalies are detected in a particular dataset, the threshold may be set to double that number. The threshold may be predetermined and stored by data analysis system 102. In some embodiments, the threshold may be calculated by segmentation subsystem 116 based on past segmentation operations. Thus, segmentation subsystem 116 may compare the number of anomalies identified within the segments with the threshold number. In some embodiments, segmentation subsystem 116 may compare the number of anomalies within each segment set with the threshold and determine that the threshold is not met when the number of anomalies in every segment set does not meet the threshold. For example, a first segment set may include ten anomalies. Thus, if the threshold is one hundred, segmentation subsystem 116 may determine that the threshold is not met.

Segmentation subsystem 116 may perform the same determination for other segment sets. Thus, if the threshold is met by comparison with anomalies within one segment set, the segmentation task has been successful. However, if none of the segment sets meet the threshold number of anomalies, the segmentation task may continue. Thus, in some embodiments, segmentation subsystem 116 may perform the following operations to determine that the first number of anomalies does not meet the threshold. Segmentation subsystem 116 may retrieve a plurality of numbers of anomalies. Each number of anomalies may correspond to a segment set, and each segment set may include a plurality of segments for a combination of features for the first level of the hierarchy. For example, a dataset may have three different features and the first level of hierarchy may specify that two features should be used in combination. Thus, segmentation subsystem 116 may generate segment sets of two-feature combinations. For example, the first segment set may include all entries with a combination of features one and two. The second segment set may include all entries with a combination of features one and three. The third segment set may include all entries with a combination of features two and three. Thus, segmentation subsystem 116 may generate three different segment sets and run anomaly detection on the segments in each set. Once anomaly detection is completed, segmentation subsystem 116 may determine a number of anomalies in each segment set (e.g., add the number of anomalies detected within each segment of each segment set).

When the number of anomalies in each segment set is determined, segmentation subsystem 116 may determine a highest number of anomalies from the plurality of numbers of anomalies. That is, segmentation subsystem 116 may select the highest number of anomalies and compare the highest number of anomalies with the threshold. In some embodiments, segmentation subsystem 116 may, instead of the highest number of anomalies, select an average number of anomalies per segment set.

Based on determining that the first number of anomalies does not meet the threshold, segmentation subsystem 116 may generate a second plurality of timeseries dataset segments based on a second level of the hierarchy and the aggregation time interval. The second level of the hierarchy may correspond to a second number of features that is larger than the first number of features. For example, the second level of the hierarchy may correspond to two-feature combinations. FIG. 5 illustrates segments split using a two-feature combination. The two-feature combination includes field 506 (Folder ID) and field 509 (System ID). Thus, table 500 illustrates a segment that has a unique combination of values in fields 506 and 509 (e.g., Folder_A and System_1). Table 520 has a different unique combination of values in fields 506 and 509 (e.g., Folder_B and System_2). Furthermore, table 540 has another different unique combination of values in fields 506 and 509 (e.g., Folder_A and System_2).

In some embodiments, segmentation subsystem 116 may transform each segment into a timeseries dataset segment based on the features selected according to the second level of the hierarchy. In addition, segmentation subsystem 116 may use the time interval to transform the data into a timeseries dataset segment. In some embodiments, segmentation subsystem 116 may perform the transformation by retrieving the time interval and aggregating the entries in each segment over the time interval. Thus, the resulting timeseries dataset segment may include the aggregated target values (e.g., bytes read aggregated over a one-hour interval).

In some embodiments, segmentation subsystem 116 may generate the second plurality of timeseries dataset segments based on the second level of the hierarchy with the following operations. Segmentation subsystem 116 may generate, based on the second number of features, a plurality of feature combinations for features of the dataset. For example, as illustrated in FIG. 5, a feature combination may be a combination of values in field 506 and field 509. Thus, table 500 may include a combination of Folder_A in field 506 and System_1 in field 509, while table 520 may include Folder_B and System_2 in field 506 and field 509, respectively.

Segmentation subsystem 116 may then determine, for each feature combination of the plurality of feature combinations, a corresponding plurality of entries with matching values within features of corresponding feature combinations. For example, segmentation subsystem 116 may search the dataset for all entries that include Folder_A in field 506 and System_1 in field 509. The resulting segment may include all entries with those values. Segmentation subsystem 116 may continue creating segments based on other values in those fields (e.g., generating segments as illustrated in table 520 and table 540). When segmentation subsystem 116 finishes with those values, segmentation subsystem 116 may generate a segment set for that combination including all the segments generated (e.g., as shown in table 500, table 520, and table 540). Segmentation subsystem 116 may then generate segment sets for other combinations of features. Segmentation subsystem 116 may generate the second plurality of timeseries dataset segments that include the corresponding plurality of entries. For example, segmentation subsystem 116 may then use an aggregation time interval (e.g., one hour) and aggregate entries within each segment in the target variable (e.g., bytes read) to generate a timeseries that includes a value (e.g., bytes read) for each time interval (e.g., for each hour).

Segmentation subsystem 116 may then input each timeseries dataset segment of the second plurality of timeseries dataset segments into the anomaly detection model to obtain a second number of anomalies for the second plurality of timeseries dataset segments. This may be similar to the process described above with respect to inputting the timeseries dataset segments of the first plurality into the machine learning mode.

Segmentation subsystem 116 may determine that the second number of anomalies meets the threshold. For example, as discussed above, data analysis system 102 may store a threshold for a number of anomalies that need to be detected within the dataset segments to determine that the segmentation is successful. The threshold may be determined based on a usual number of anomalies detected in such a dataset. For example, if on average one hundred or one thousand anomalies are detected in a particular dataset, the threshold may be set to double that number. The threshold may be predetermined and stored by data analysis system 102.

In some embodiments, the threshold may be calculated by segmentation subsystem 116 based on past segmentation operations. Thus, segmentation subsystem 116 may compare the number of anomalies identified within the segments with the threshold number. In some embodiments, segmentation subsystem 116 may compare the number of anomalies within each segment set with the threshold and determine that the threshold is not met when the number of anomalies in every segment set does not meet the threshold. For example, a first segment set may include ten anomalies. Thus, if the threshold is one hundred, segmentation subsystem 116 may determine that the threshold is not met. Segmentation subsystem 116 may perform the same determination for other segment sets. Thus, if the threshold is met by comparison with anomalies within one segment set, the segmentation task has been successful. However, if none of the segment sets meet the threshold number of anomalies, the segmentation task may continue.

The data analysis system described herein may also be used in a financial context. FIG. 6 illustrates a plurality of segments generated on a dataset for a financial application of the system. For example, a credit card processor and/or a bank may process credit card/debit card transactions for their customers (e.g., merchants and individuals). There may be, for example, hundreds of thousands or millions of transactions per day. Some of those transactions may be fraudulent. However, determining fraudulent transactions may be extremely difficult when such a large number of transactions occurs with wildly different payment amounts and in different locations. For example, a particular merchant may have different locations throughout a country or throughout the world with different pricing for different items in different currencies. Thus, determining any fraudulent transactions may be extremely difficult with thousands of transactions per day just for that merchant.

Accordingly, the credit card processor and/or the bank may use anomaly detection to identify anomalous transactions which may be fraudulent transactions. However, anomaly detection in this context may be too difficult because there are too many transactions with wildly different payment amounts (e.g., the dataset is too large). Thus, the credit card processor and/or the bank may use the operations of the current disclosure to aid in fraud detection. FIG. 6 illustrates an excerpt of a dataset split into segments based on merchant name (field 603) and location (field 606). Thus, segment 600 may include all entries (e.g., transactions) for merchant AA_1 located in New York. Segment 620 may include all entries for merchant AA_1 (the same merchant) located in Chicago. Segment 640 may include all entries for merchant CC_1 located in New York. Other segments may be generated based on the combination of field 603 and field 606 depending on the entries within the dataset. Field 609 may include an amount of the transaction, which may be the target field. Other features may be included in the dataset, for example, the timestamp of each transaction.

Segmentation subsystem 116 may then pass the results of the determination and/or any detected anomaly indications to rule generation subsystem 118. Rule generation subsystem 118 may include software components that access selected segment sets in memory and/or storage, and may use one or more processors to perform its operations. Rule generation subsystem 118 may generate a corresponding security rule based on each anomaly within the second plurality of timeseries dataset segments. For example, rule generation subsystem 118 may generate a security rule that prohibits a particular merchant from charging more than a certain payment amount (e.g., because fraudulent transactions were detected from that merchant).

In some embodiments, to generate a security rule for a particular anomaly, rule generation subsystem 118 may identify one or more entries associated with the anomaly. Thus, rule generation subsystem 118 may retrieve, from a first timeseries dataset segment, a time interval and a value associated with a first detected anomaly. Thus, rule generation subsystem 118 may access the timeseries data and identify the time interval during which the anomaly has been detected. For example, the anomaly at issue may have been detected in a value corresponding to a 3 PM-4 PM time interval within a timeseries dataset.

Rule generation subsystem 118 may then identify, within the dataset, a plurality of entries within the time interval matching the first timeseries dataset segment. Thus, rule generation subsystem 118 may identify the time interval and use a time feature of the original dataset to retrieve all the entries within the dataset corresponding to the dataset segment and the time interval. For example, there may be fifty entries that correspond to a particular merchant in a particular city within the time period of 3 PM-4 PM.

Rule generation subsystem 118 may then determine one or more entities within the plurality of entries that cause the first detected anomaly. For example, rule generation subsystem 118 may determine one or more locations within a particular city of a particular merchant that caused the anomaly. When rule generation subsystem 118 identifies one or more entities, rule generation subsystem 118 may determine, for the one or more entities, a corresponding threshold value. For example, a coffee shop may have several location within a particular city. For one or more of the locations, there may be fraudulent transactions. Thus, the system may determine (e.g., retrieve) a threshold (e.g., a transaction limit) for these locations and then generate a first security rule for the one or more entities with the threshold value. For example, the first security rule may specify that a merchant cannot charge more than one hundred dollars for each transaction.

When the rule is set, the system may monitor requests that match the rule and perform operations accordingly. Thus, data analysis system 102 may receive a data request from a computing device associated with an entity of the one or more entities. For example, data analysis system 102 may receive a transaction request from a merchant for a particular payment amount. Data analysis system 102 may compare the request to each rule within the system and determine whether the data request meets the corresponding security rule associated with the entity. For example, data analysis system 102 may determine that the merchant has an associated rule that limits the transaction amounts to one hundred dollars. Thus, if the request is for a payment amount of over one hundred dollars, the request may be rejected. That is, data analysis system 102 may reject the data request based on determining that the data request does not meet the corresponding security rule associated with the entity.

Computing Environment

Figure 7:
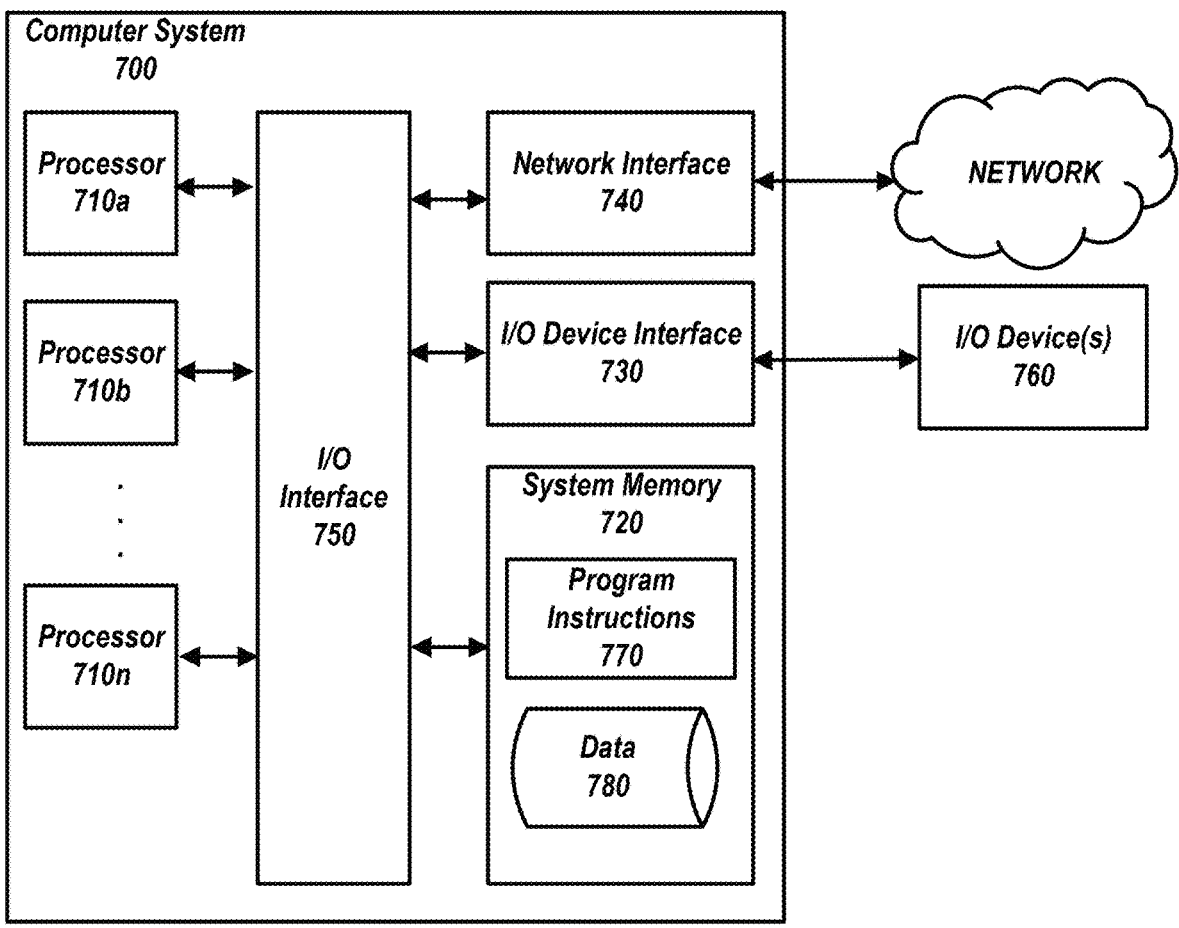
FIG. 7 shows an example computing system that may be used in accordance with one or more embodiments.

FIG. 7 shows an example computing system that may be used in accordance with some embodiments of this disclosure. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 720 may include a non-transitory computer-readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 may also be connected to other devices that are not illustrated, or may operate as a stand-alone system. In addition, the functionality provided by the illustrated components may in some embodiments be combined in fewer components, or distributed in additional components. Similarly, in some embodiments, the functionality of some of the illustrated components may not be provided or other additional functionality may be available.

Operation Flow

Figure 8:
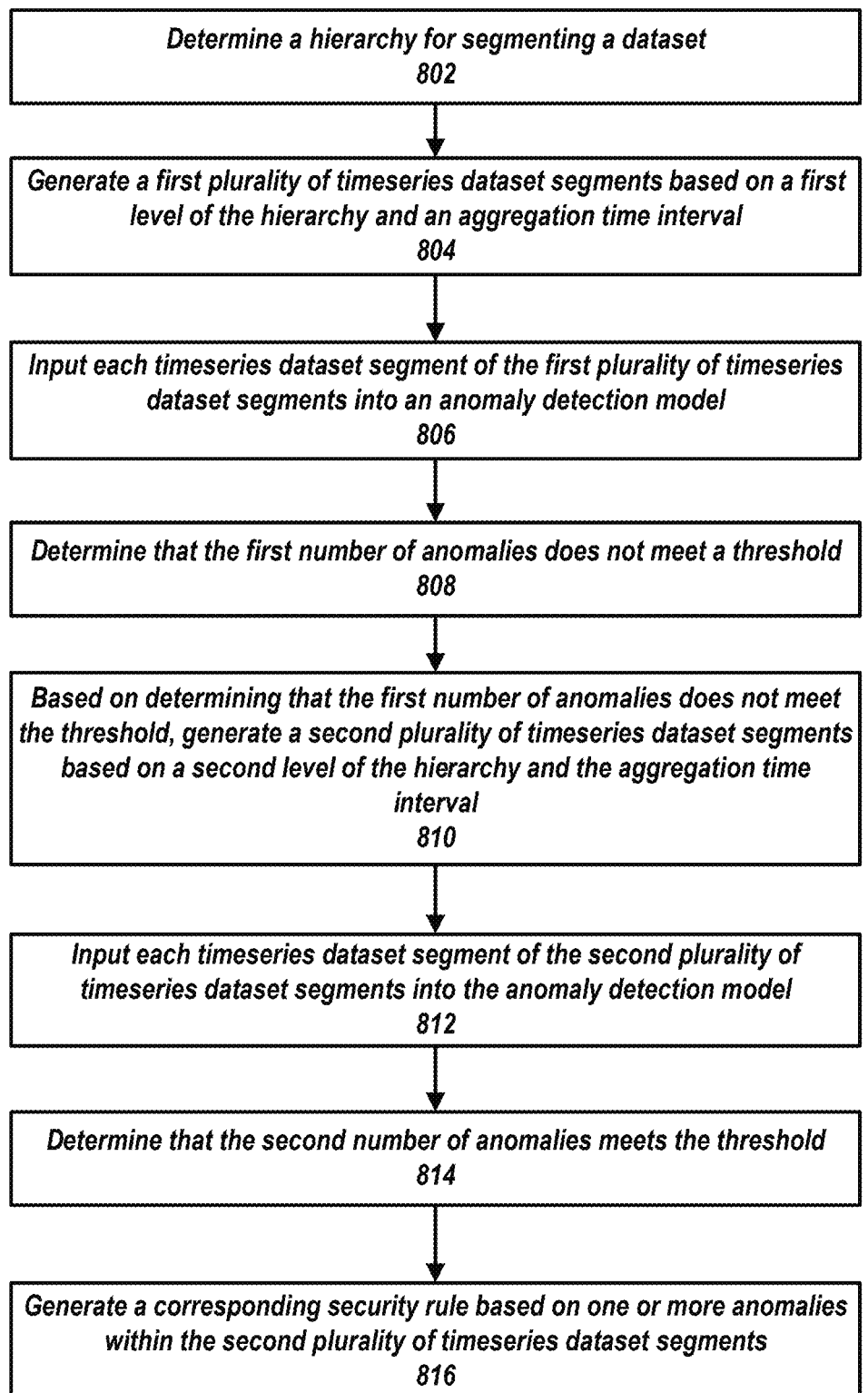
FIG. 8 shows a flowchart of operations for generating security rules based on timeseries anomalies, in accordance with one or more embodiments.

FIG. 8 shows a flowchart of operations for generating security rules based on timeseries anomalies. The operations of FIG. 8 may use components described in relation to FIG. 7. At 802, a data analysis system determines a hierarchy for segmenting a dataset. For example, the data analysis system may be hosted on a computer system (e.g., computer system 700). The data analysis system may use one or more processors 710a-710n to perform this operation. At 804, the data analysis system generates a first plurality of timeseries dataset segments based on a first level of the hierarchy and an aggregation time interval. The data analysis system may use one or more processors 710a-710n to perform the generation operation, and may store the results in system memory 720.

At 806, the data analysis system inputs each timeseries dataset segment of the first plurality of timeseries dataset segments into an anomaly detection model. The data analysis system may use one or more processors 710a-710n to perform this operation via one or more application programming interfaces associated with the anomaly detection model. For example, the data analysis system may use I/O interface 750 to perform the input operation, and/or use the network (e.g., network 150) when the anomaly detection model (e.g., machine learning model 402) is located on a different computing device.

At 808, the data analysis system determines that the first number of anomalies does not meet a threshold. The data analysis system may use one or more processors 710a-710n to perform this operation. At 810, the data analysis system, based on determining that the first number of anomalies does not meet the threshold, generates a second plurality of timeseries dataset segments based on a second level of the hierarchy and the aggregation time interval. The data analysis system may perform this operation using one or more processors 710a-710n, and store the results in system memory 720. At 812, the data analysis system inputs each timeseries dataset segment of the second plurality of timeseries dataset segments into the anomaly detection model. The data analysis system may use one or more processors 710a-710n to perform this operation via one or more application programming interfaces associated with the anomaly detection model. For example, the data analysis system may use I/O interface 750 to perform the input operation, and/or use the network (e.g., network 150) when the anomaly detection model (e.g., machine learning model 402) is located on a different computing device.

At 814, the data analysis system determines that the second number of anomalies meets the threshold. The data analysis system may use one or more processors 710a-710n to perform this operation. At 816, the data analysis system generates a corresponding security rule based on one or more anomalies within the second plurality of timeseries dataset segments. The data analysis system may use one or more processors 710a-710n to perform this operation and store the results in system memory 720.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: determining a hierarchy for segmenting a dataset, wherein the hierarchy comprises a plurality of levels and wherein each level of the hierarchy is associated with a corresponding number of features; generating a first plurality of timeseries dataset segments based on a first level of the hierarchy and an aggregation time interval, wherein the first level of the hierarchy corresponds to a first number of features; inputting each timeseries dataset segment of the first plurality of timeseries dataset segments into an anomaly detection model to obtain a first number of anomalies for the first plurality of timeseries dataset segments; determining that the first number of anomalies does not meet a threshold; based on determining that the first number of anomalies does not meet the threshold, generating a second plurality of timeseries dataset segments based on a second level of the hierarchy and the aggregation time interval, wherein the second level of the hierarchy corresponds to a second number of features larger than the first number of features; inputting each timeseries dataset segment of the second plurality of timeseries dataset segments into the anomaly detection model to obtain a second number of anomalies for the second plurality of timeseries dataset segments; determining that the second number of anomalies meets the threshold; and generating a corresponding security rule based on one or more anomalies within the second plurality of timeseries dataset segments.

2. The method of the preceding embodiment, wherein generating the second plurality of timeseries dataset segments based on the second level of the hierarchy comprises: generating, based on the second number of features, a plurality of feature combinations for features of the dataset; determining, for each feature combination of the plurality of feature combinations, a corresponding plurality of entries with matching values within features of corresponding feature combinations; and generating the second plurality of timeseries dataset segments that include the corresponding plurality of entries.

3. The method of any of the preceding embodiments, wherein generating the corresponding security rule comprises: retrieving, from a first timeseries dataset segment, a time interval and a value associated with a first detected anomaly; identifying, within the dataset, a plurality of entries within the time interval matching the first timeseries dataset segment; and determining one or more entities within the plurality of entries that cause the first detected anomaly.

4. The method of any of the preceding embodiments, further comprising: determining, for the one or more entities, a corresponding threshold value; and generating a first security rule for the one or more entities with the threshold value.

5. The method of any of the preceding embodiments, further comprising: receiving a data request from a computing device associated with an entity of the one or more entities; determining whether the data request meets the corresponding security rule associated with the entity; and rejecting the data request based on determining that the data request does not meet the corresponding security rule associated with the entity.

6. The method of any of the preceding embodiments, wherein determining that the first number of anomalies does not meet the threshold further comprises: retrieving a plurality of numbers of anomalies, wherein each number of anomalies corresponds to a segment set, and wherein each segment set includes a plurality of segments for a combination of features for the first level of the hierarchy; determining a highest number of anomalies from the plurality of numbers of anomalies; and comparing the highest number of anomalies with the threshold.

7. The method of any of the preceding embodiments, wherein each level of the hierarchy comprises one or more identifiers associated with one or more features for generating one or more corresponding segment sets.

8. The method of any of the preceding embodiments, wherein generating the first plurality of timeseries dataset segments comprises: retrieving, from a data structure representing the hierarchy, data associated with the first level of the hierarchy; extracting a plurality of features from the data associated with the first level of the hierarchy; and generating a plurality of dataset segments based on the plurality of features extracted from the first level of the hierarchy.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the one or more processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for generating security rules based on timeseries anomalies, the system comprising:

one or more processors and memories storing instructions that, when executed by the one or more processors, cause operations comprising:

retrieving a hierarchy for segmenting a dataset;

generating a first plurality of timeseries dataset segments based on (i) a first level of the hierarchy that corresponds to a first number of features and (ii) an aggregation time interval;

obtaining, via an anomaly detection machine learning model, based on the first plurality of timeseries dataset segments, a first number of anomalies for the first plurality of timeseries dataset segments;

in response to determining that the first number of anomalies does not satisfy a threshold, generating a second plurality of timeseries dataset segments based on (i) a second level of the hierarchy that corresponds to a second number of features larger than the first number of features and (ii) the aggregation time interval;

obtaining, via the anomaly detection machine learning model, based on the second plurality of timeseries dataset segments, a second number of anomalies for the second plurality of timeseries dataset segments; and in response to determining that the second number of anomalies meets the threshold, generating a corresponding security rule based on one or more anomalies of the second plurality of timeseries dataset segments.

2. The system of claim 1, wherein generating the first plurality of timeseries dataset segments comprises:

generating, based on the first number of features, a plurality of feature combinations for a plurality of features of the dataset;

determining, for each feature combination of the plurality of feature combinations, a corresponding plurality of entries with matching values within features of corresponding feature combinations; and generating the first plurality of timeseries dataset segments that include the corresponding plurality of entries.

3. A method comprising:

generating first timeseries dataset segments based on a first level of a hierarchy and an aggregation time interval, wherein the first level of the hierarchy corresponds to a first number of features;

obtaining, via an anomaly detection model, a first number of anomalies for the first timeseries dataset segments;

determining that the first number of anomalies does not meet a threshold;

generating second timeseries dataset segments based on (i) a second level of the hierarchy, (ii) the aggregation time interval, and (iii) the determination that the first number of anomalies does not meet the threshold, wherein the second level of the hierarchy corresponds to a second number of features different from the first number of features;

obtaining, via the anomaly detection model, a second number of anomalies for the second timeseries dataset segments;

determining that the second number of anomalies meets the threshold; and generating a corresponding security rule based on (i) one or more anomalies within the second timeseries dataset segments and (ii) the determination that the second number of anomalies meets the threshold.

4. The method of claim 3, wherein generating the second timeseries dataset segments comprises:

generating, based on the second number of features, a plurality of feature combinations for features of a dataset;

determining, for each feature combination of the plurality of feature combinations, a corresponding plurality of entries with matching values within features of corresponding feature combinations; and generating the second timeseries dataset segments that include the corresponding plurality of entries.

5. The method of claim 3, wherein generating the corresponding security rule comprises:

retrieving, from at least one timeseries dataset segment of the second timeseries dataset segments, a time interval and a value associated with a first detected anomaly;

identifying, within a dataset, a plurality of entries within the time interval matching the at least one timeseries dataset segment;

determining one or more entities within the plurality of entries that cause the first detected anomaly; and generating the corresponding security rule related to the one or more entities.

6. The method of claim 5, wherein generating the corresponding security rule comprises generating a first security rule that restricts the one or more entities with a transaction amount threshold based on (i) the determination of the one or more entities and (ii) the determination that the second number of anomalies meets the threshold.

7. The method of claim 5, further comprising:

receiving a data request from a computing device associated with an entity of the one or more entities;

determining that the data request does not meet the corresponding security rule associated with the entity; and rejecting the data request based on determining that the data request does not meet the corresponding security rule associated with the entity.

8. The method of claim 3, wherein determining that the first number of anomalies does not meet the threshold further comprises:

retrieving a plurality of numbers of anomalies, wherein each number of anomalies corresponds to a segment set, and wherein each segment set includes a plurality of segments for a combination of features for the first level of the hierarchy;

determining a highest number of anomalies from the plurality of numbers of anomalies; and comparing the highest number of anomalies with the threshold.

9. The method of claim 3, wherein generating the first timeseries dataset segments comprises:

retrieving, from a data structure representing the hierarchy, data associated with the first level of the hierarchy;

extracting a plurality of features from the data associated with the first level of the hierarchy; and generating a plurality of dataset segments based on the plurality of features extracted from the first level of the hierarchy.

10. The method of claim 3, wherein each level of a plurality of levels of the hierarchy comprises one or more identifiers associated with one or more features for generating one or more corresponding segment sets.

11. The method of claim 3, wherein the first level of the hierarchy and the second level of the hierarchy correspond to respective time-related features.

12. The method of claim 3, wherein the second level of the hierarchy correspond to a plurality of columns or a plurality of rows of a data table.

13. One or more non-transitory computer-readable media storing instructions that, when executed by one or more processors, cause operations comprising:

generating first timeseries dataset segments based on a first level of a hierarchy and an aggregation time interval, wherein the first level of the hierarchy corresponds to a first number of features;

obtaining, via one or more anomaly detection models, a first number of anomalies for the first timeseries dataset segments;

generating second timeseries dataset segments based on (i) a second level of the hierarchy, (ii) the aggregation time interval, and (iii) a determination that the first number of anomalies does not meet a threshold, wherein the second level of the hierarchy corresponds to a second number of features different from the first number of features;

obtaining, via the one or more anomaly detection models, a second number of anomalies for the second timeseries dataset segments; and generating a corresponding security rule based on (i) one or more anomalies within the second timeseries dataset segments and (ii) the second number of anomalies meeting the threshold.

14. The one or more non-transitory computer-readable media of claim 13, wherein generating the second timeseries dataset segments comprises:

generating, based on the second number of features, a plurality of feature combinations for features of a dataset;

determining, for each feature combination of the plurality of feature combinations, a corresponding plurality of entries with matching values within features of corresponding feature combinations; and generating the second timeseries dataset segments that include the corresponding plurality of entries.

15. The one or more non-transitory computer-readable media of claim 13, wherein generating the corresponding security rule comprises:

retrieving, from at least one timeseries dataset segment of the second timeseries dataset segments, a time interval and a value associated with a first detected anomaly;

identifying, within a dataset, a plurality of entries within the time interval matching the at least one timeseries dataset segment; and determining one or more entities within the plurality of entries that cause the first detected anomaly.

16. The one or more non-transitory computer-readable media of claim 15, wherein generating the corresponding security rule comprises generating a first security rule that restricts the one or more entities with a transaction amount threshold based on (i) the determination of the one or more entities and (ii) the determination that the second number of anomalies meets the threshold.

17. The one or more non-transitory computer-readable media of claim 15, the operations further comprising:

receiving a data request from a computing device associated with an entity of the one or more entities; and rejecting the data request based on determining that the data request does not meet the corresponding security rule associated with the entity.

18. The one or more non-transitory computer-readable media of claim 13, wherein determining that the first number of anomalies does not meet the threshold comprises:

retrieving a plurality of numbers of anomalies, wherein each number of anomalies corresponds to a segment set, and wherein each segment set includes a plurality of segments for a combination of features for the first level of the hierarchy;

determining a highest number of anomalies from the plurality of numbers of anomalies; and comparing the highest number of anomalies with the threshold.

19. The one or more non-transitory computer-readable media of claim 13, wherein generating the first timeseries dataset segments comprises:

retrieving, from a data structure representing the hierarchy, data associated with the first level of the hierarchy;

extracting a plurality of features from the data associated with the first level of the hierarchy; and generating a plurality of dataset segments based on the plurality of features extracted from the first level of the hierarchy.

20. The one or more non-transitory computer-readable media of claim 13, wherein each level of a plurality of levels of the hierarchy comprises one or more identifiers associated with one or more features for generating one or more corresponding segment sets.

* * * * *